(12) United States Patent
Nakaya et al.

(10) Patent No.: US 6,409,398 B2
(45) Date of Patent: *Jun. 25, 2002

(54) OPTICAL MODULE AND MANUFACTURING METHOD OF OPTICAL MODULE

(75) Inventors: Susumu Nakaya; Hideyuki Tanaka, both of Tokyo (JP)

(73) Assignee: OKI Electric Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,165

(22) Filed: Dec. 7, 1998

(30) Foreign Application Priority Data

Dec. 12, 1997 (JP) .............................. 9-341777
Sep. 30, 1998 (JP) ........................... 10-278087

(51) Int. Cl.[7] ................................. G02B 6/36
(52) U.S. Cl. ............................. 385/93; 385/92; 385/33
(58) Field of Search ............... 385/88, 89, 90, 385/91, 92, 93, 94, 24, 147

(56) References Cited

U.S. PATENT DOCUMENTS 4,790,618 A * 12/1988 Abe ........................... 385/93
5,333,224 A * 7/1994 Kikuchi ..................... 385/93
5,452,389 A * 9/1995 Tonai et al. ................ 385/92
5,537,503 A * 7/1996 Tojo et al. .................. 385/91
5,666,450 A * 9/1997 Fujimura et al. ........... 385/90
5,764,826 A * 6/1998 Kuhara et al. .............. 385/24
5,841,924 A * 11/1998 Mugiya et al. ............. 385/93
5,841,932 A * 11/1998 Kyoya ....................... 385/93
5,949,939 A * 9/1999 Kyoya ....................... 385/93
6,053,641 A * 4/2000 Chun ......................... 385/93

* cited by examiner

Primary Examiner—Frank G. Font
Assistant Examiner—Sang H. Nguyen
(74) Attorney, Agent, or Firm—Wenderoth, Lind & Ponack, L.L.P.

(57) ABSTRACT

An optical module according to the present invention has a stem having an interconnection terminal; an optical device positioned on the stem and electrically connected to the interconnection terminal; a cap fixed onto the stem so as to enclose the optical device within the cap; and a lens for optically coupling the optical device with an optical member positioned outside the cap. As a feature of this optical module, the cap is manufactured with a high degree of precision so that the height of the cap with respect to the stem can be used as a positional reference in the direction of the optical axis of the optical system, which consists of the optical device, the lens, and the optical member extending outside the cap. In addition, the shape of the side wall of the cap is designed so that it can function as a reference for maintaining the coaxiality between the photo detector and the lens. The stem is fixed to the cap at the proper position for a high precision.

21 Claims, 6 Drawing Sheets

OPTICAL MODULE AND MANUFACTURING METHOD OF OPTICAL MODULE

BACKGROUND OF THE INVENTION

1. Field of the Invention

This invention relates to an optical module used to transmit and receive optical signals in optical communications systems.

2. Description of Related Art

In general, optical signals which have been transmitted through optical fibers are received by the input ports of receivers, and converted into electric signals by photo detector modules using, for example, photo diodes (PD).

The size of the detection area of the photo detector used in such a photo detector module is very small (having a diameter of about 80 μm. In order to efficiently receive the optical beam emitted from the optical fiber into the photo detecter, a collecting lens is typically used. For example, a technique of aattaching a ball lens directly to the cap of the photo detecter is known as a low-cost light-collecting method.

Figure 1:
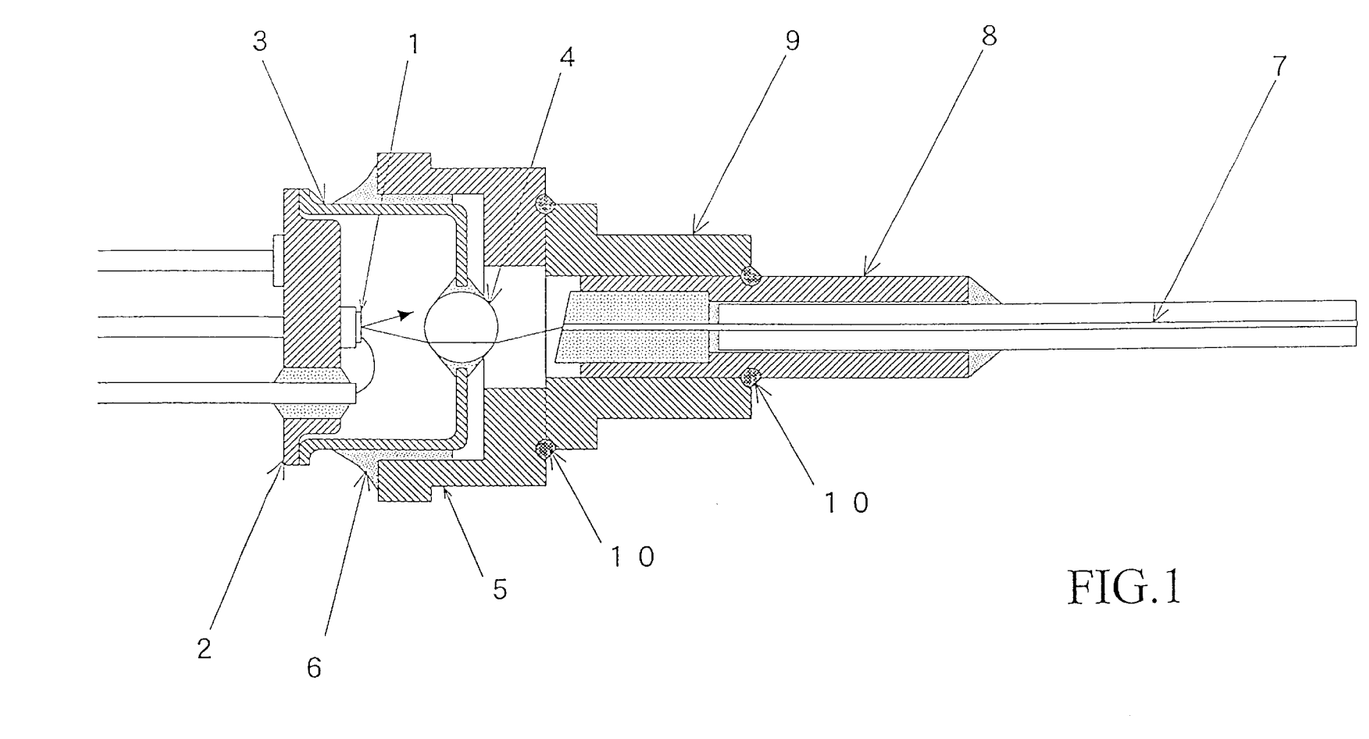
FIG. 1 illustrates a conventional photo detector module.

FIG. 1 illustrates an example of this type of photo detector module. This photo detector module comprises a commercially available stem 2, which is generally referred to as a TO-46 type stem, and a photo detecter 1 mounted on the stem 2. The stem 2 is fixed to a cap 3 so that the photo detecter 1 is accommodated in the cap 3. A ball lens 4 made of low-temperature-melting glass is attached to the middle of the cap. The cap 3 is fixed to a holder 5 by a bond 6, such as adhesive or solder.

An optical fiber 7 is connected to the holder 5 via a sleeve 9. To be more precise, the optical fiber 7 is inserted in a ferrule 8, and the ferrule 8 is inserted in and fixed at the sleeve 9 by YAG welding. As a result of the YAG welding, nuggets 10 are formed at the boundaries between the holder 5 and the ferrule 8, and at the boundaries between the ferrule 8 and the sleeve 9.

In assembling the conventional photo detector, first, the photo detector 1 is bonded to the stem 2. Then, the stem 2 is fitted into the cap 3, to which the ball lens 4 has already been fixed, and the stem 2 is fixed to the cap 3 by resistence-welding.

Then, the holder 5 is fixed to the cap 3 at the end opposite the stem 2 by a bond 6. The cap 3 can not be directly YAG welded because the cap 3 is press-processed.

Finally, the optical fiber 7 is positioned in the optimal position by an optical alignment technique, and then fixed to the holder 5, via the sleeve 9, by YAG welding.

When this photo detector module is used for high-speed transmission in a STM system, the optical signal which has been propagated through the optical fiber 7 must be prevented from being reflected by the surface of the photo detector 1 back to the transmission path. For this reason, the end surfaces of the ferrule 8 and the optical fiber 7, which face the surface of the ball lens 4, are slanted by grinding or polishing for the purpose of inclining the incident angle of the beam onto the photo detector 1, and for the purpose of reducing the return light to the optical fiber 7.

In particular, if the inclination of the end surface of the optical fiber 7 is set to about 12 degrees, the incident angle of the beam on the photo detector 1 becomes about 6 degrees, which can reduce the reflected component of the signal light to less than −40 dB.

However, this arrangement causes a large variation in the quantity of the reflected light because the coaxiality between the photo detector 1 and the ball lens 4 is lost.

Figure 2A:
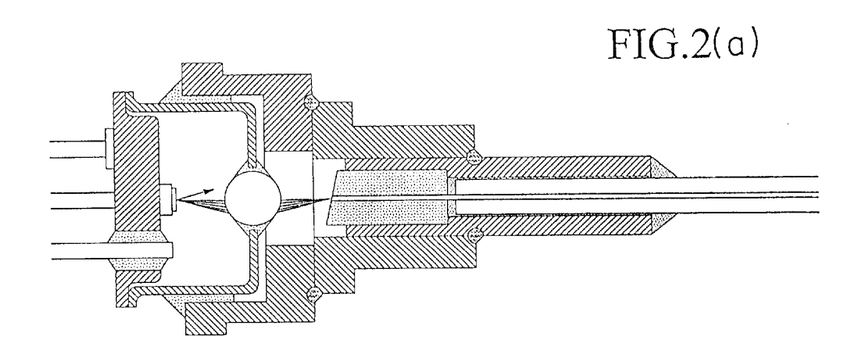
FIG. 2 illustrates the relationship between the optical coupling state and the coaxiability between the photo detector and the ball lens of the conventional photo detector module.
Figure 2B:
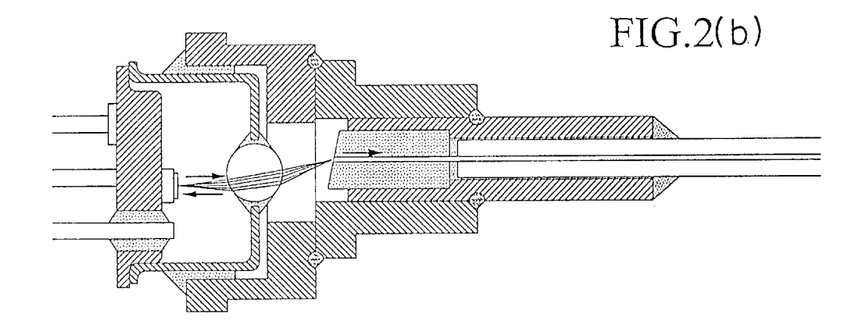
Figure 2C:
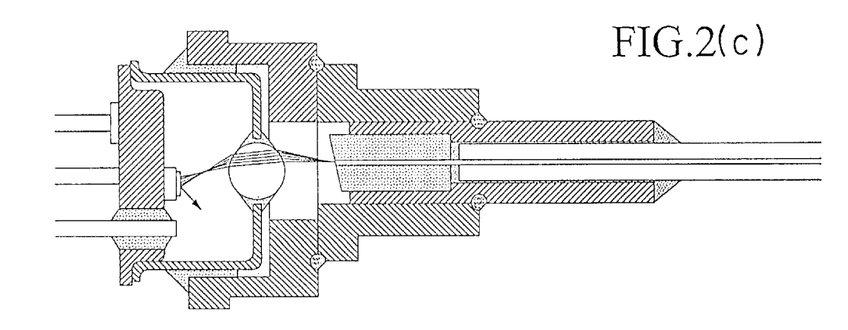

FIGS. 2(1) through 2(3) show the optical coupling and the coaxiality between the photo detector 1 and the ball lens 4.

FIG. 2(1) illustrates the optical connection at the optimal position with little separation between the ball lens 4 and the photo detector 1. In this arrangement, the light emitted from the optical fiber 7 strikes the photo detector 1 at an optimal incident angle, and the amount of the light reflected back to the optical fiber 7 via the ball lens 4 is greatly reduced. In this arrangement, the orientation of the end surface of the optical fiber 7 does not affect the physical properties of the optical connection between the ball lens 4 and the photo detector 1.

However, if the optical axes of the photo detector 1 and the ball lens 4 are offset from each other, as shown in FIGS. 2(2) and 2(3), the quantity of reflected light increases, while the coupling efficiency decreases.

For example, if the separation between the photo detector 1 and the ball lens 4 and the orientation of the slanted end surface of the optical fiber 7 satisfy particular conditions (that is, if the orientation of the end surface of the optical fiber 7 is 12 degrees, and if the separation is about 0.11 mm, as shown in FIG. 2(2)), then a problem arises. In the example of FIG. 2(2), if the optical fiber 7 is aligned at the optimal position, the light which exits obliquely from the optical fiber 7 strikes the surface of the photo detector 1 at a normal angle. The normal incident light is reflected by the photo detector, and returns along the same path as the incident light to the optical fiber 7. The amount of reflected light may reach a maximum in this arrangement.

On the other hand, as shown in FIG. 2(3), if the orientation of the inclined end surface of the optical fiber 7 is opposite the orientation shown in FIG. 2(2), the quantity of reflected light is reduced. However, in this arrangement, the light emitted from the optical fiber 7 passes through the ball lens 4 at a position offset from the center axis of the ball lens 4. As a result, the spherical aberration of the ball lens 4 adversely affects the system, which reduces the optical coupling efficiency and causes the light-collecting ability of the photo detector to deteriorate.

In addition to these problems, the coaxiability between the photo detector 1 and the ball lens 4 of the conventional photo detector module may be offset by 0.25 mm at most due to the following factors:

(1) Because there is no target or alignment mark on the stem 2, the photo detector 1 can not be precisely bonded;

(2) Because the cap 3 is press-processed, its dimensional stability is insufficient and, accordingly, a large clearance is required at the portion for receiving the stem 2, which causes the optical axes of the stem 2 and the cap 3 to be offset from each other during the resistance welding step; and (3) It is mechanically difficult to accurately fix the ball lens 4 in the center of the cap 3.

If the separation between the photo detector 1 and the ball lens 4 is large, the amount of reflected light and the coupling efficiency vary greatly with the slanting orientation of the end surface of the optical fiber 7. In order to achieve a predetermined desired performance, employing an optical alignment technique for setting the orientation of the slanting end surface of the optical fiber 7 at the optimal angle, while monitoring the reflected light and the coupling efficiency, is indispensable. However, such an optical alignment technique requires a number of steps, and the production yield is lowered as a result In addition, it is also difficult in the conventional photo detector module to precisely position the holder 5 with respect to the cap 3 along the optical axis (i.e., the z-axis) because of the existence of adhesive or solder. Since the optical fiber 7 must be precisely positioned both in the direction perpendicular to the optical axis and in the direction parallel to the optical axis, the ferrule 8 and the holder 5 need to be secured at two positions via the sleeve 9 by YAG welding.

Furthermore, an adhesive or solder is also used to fix the holder 5 to the cap 3, which is not preferable for maintaining the reliability of the optical module for a long period of time.

SUMMARY OF THE INVENTION

Therefore, it is an object of the invention to overcome these problems in the prior art, and to provide an optical module which comprises a stem having an interconnection terminal; an optical device positioned on the stem and electrically connected to the interconnection terminal; a cap fixed onto the stem so as to enclose the optical device within the cap; and a lens for optically coupling the optical device with an optical member positioned outside the cap. As a feature of this optical module, the cap is manufactured with a high degree of precision so that the height of the cap with respect to the stem can be used as a positional reference in the direction of the optical axis of the optical system, which consists of the optical device, the lens, and the optical member extending outside the cap.

In addition, the shape of the side wall of the cap is designed so that it can function as a reference for maintaining the coaxiality between the photo detector and the lens. The stem is fixed to the cap at the proper position for a high precision.

BRIEF DESCRIPTION OF THE DRAWINGS

The above and other objects and features of the invention will become more apparent from the following detailed description of the preferred embodiments with reference to the attached drawings, wherein.

DETAILED DESCRIPTION OF THE PREFERRED EMBODIMENTS

Figure 3:
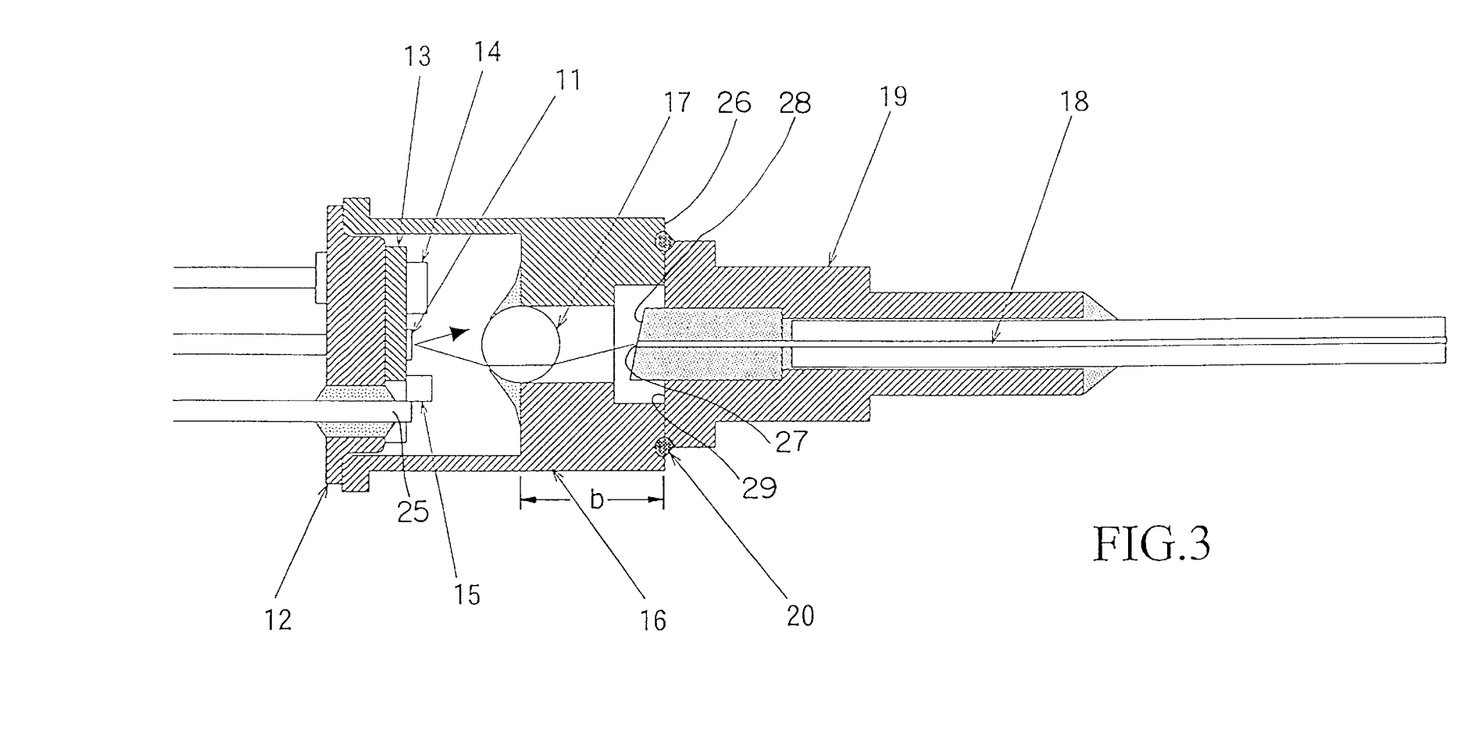
FIG. 3 is a cross-sectional view of the optical module according to an embodiment of the invention.
Figure 4:
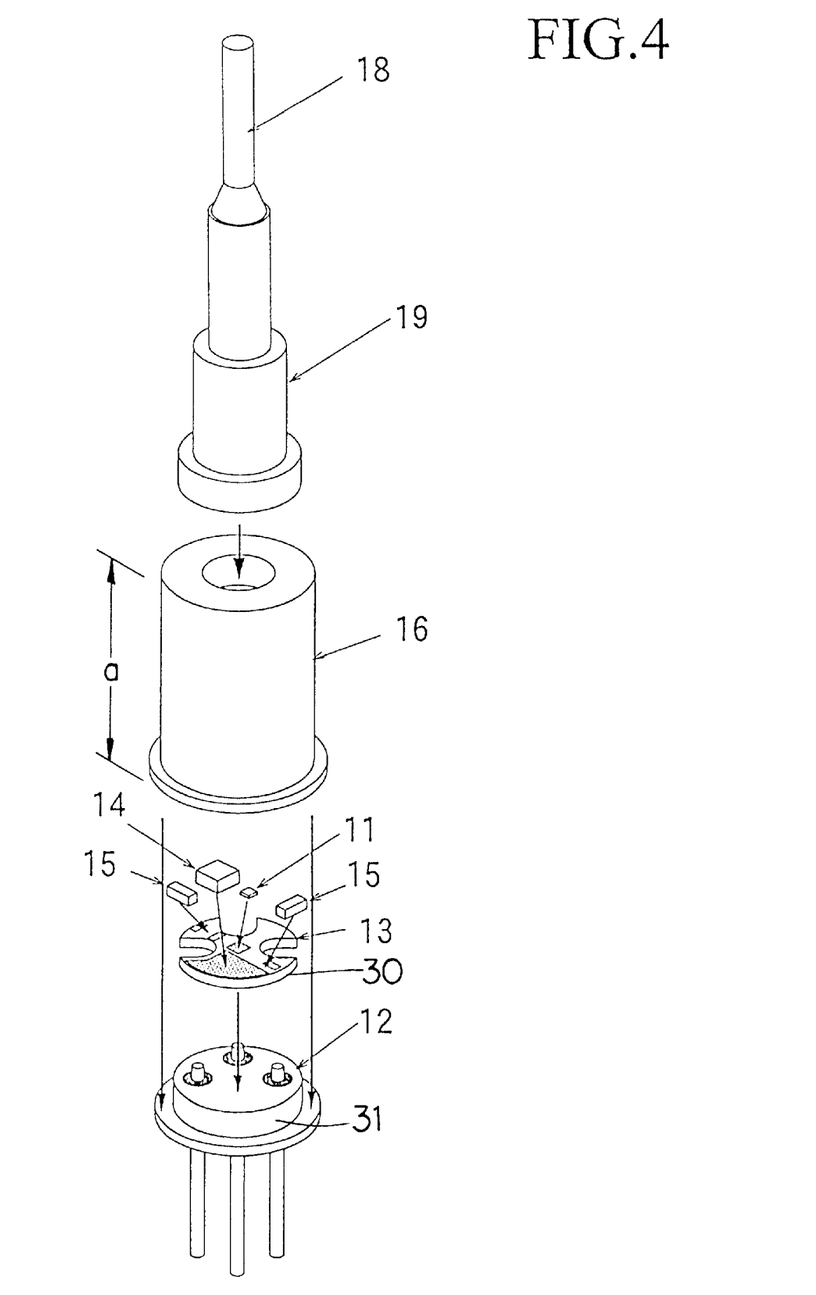
FIG. 4 is an exploded perspective view of the optical module, which is used to explain the process of assembling the optical module of the invention.
Figure 5A:
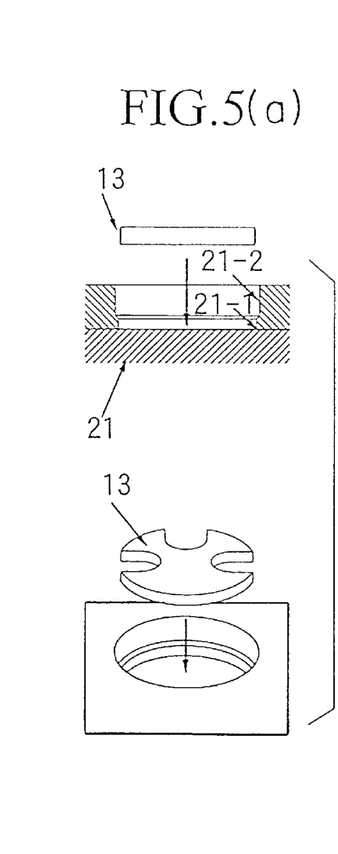
FIG. 5 illustrates how the stem is fixed to a base.
Figure 5B:
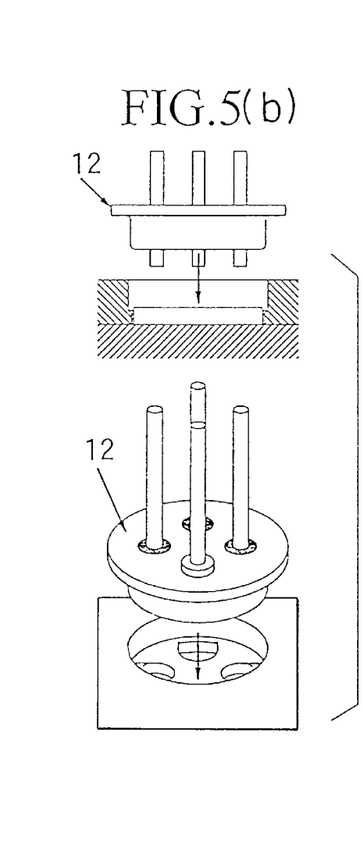
Figure 5C:
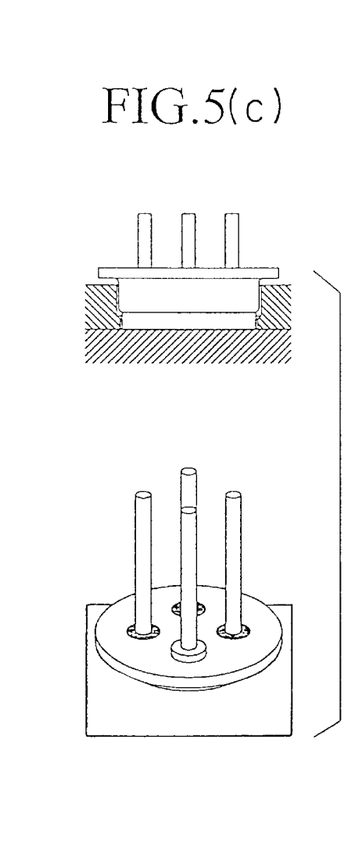
Figure 5D:
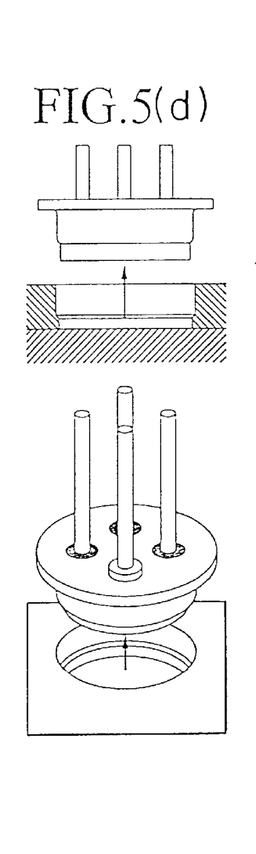

The preferred embodiments of the invention will now be described in detail with reference to the attached drawings. FIG. 3 is a cross-sectional view of the optical module according to a preferred embodiment of the invention, and FIG. 4 is an exploded perspective view of the optical module of this embodiment, which shows how this optical module is assembled.

In this embodiment, a photo detector 11 consisting of a photo diode (PD) is used as the optical device. The photo detector 11 is mounted on a pad provided on the surface of a base 13 made of ceramic. The base 13 is fixed to a metallic stem 12 which is commercially available under the trade name of "TO-46 type". The base 13 is capable of receiving a simple circuit including, for example, a pre-amplifier 14 and a capacitor 15, in addition to the photo detector 11. In this embodiment, these circuitry elements are electrically connected to the interconnection terminal 25 of the stem 12, whereby a photo detector module having a built-in pre-amplifier is formed.

A metallic cap 16 is fixed to the stem 12 by resistance welding, so that the photo detector 11 on the stem 12 is enclosed within the cap 16. A ball lens 17 is fixed in the middle of the cap 16 by low-temperature-melting glass. The ball lens 17 is used to optically couple the photo detector 11 with an optical member 18 positioned outside the cap 16.

The cap 16 is formed with a high degree of precision by cutting processes, unlike the conventional cap which is formed by press processes. The height "a" (shown in FIG. 4) of the cap 16 with respect to the stem 12 is used as a positional reference in the z-direction along the optical axis of the system, which extends from the ball lens 17 along the external optical member. Thus, the cap is precisely formed to have a predetermined height so as to maintain a predetermined distance between the photo detector 11 and the end surface of the optical member 18. In particular, the cap 16 is shaped so that the top surface 26 of the cap 16 is positioned a predetermined distance "b" (shown in FIG. 3) from the ball lens 17. In other words, as shown in FIG. 3, the thickness of the top wall of the cap 16 is adjusted so that the focal point 27 of the ball lens 17 is positioned below the top surface of the cap 16.

The external optical member 18 is, for example, an optical fiber 18 in this embodiment. The end surface of the optical fiber 18 is optically coupled to the cap 16. The optical fiber 18 is held by a ferrule 19 which functions as a fiber holder. The end surface of the ferrule 19 is fixed to the top surface of the cap 16 by YAG welding, whereby the optical fiber 18 is also secured to the cap 16. The end surface 28 of the optical fiber 18 projects from the end surface 29 of the ferrule 19 by a predetermined length along the optical axis, such that the focal point 27 of the ball lens 17 is located within the plane of the end surface of the optical fiber 18. As a result of the YAG welding of the ferrule 19 to the cap 16, a nugget 20 is formed at the boundary between the ferrule 19 and the cap 16.

Next, the process of assembling this photo detector module will be described. Many techniques for achieving highly precise alignment between the photo detector 11 and the ball lens 17 are employed in this invention.

First, the base 13, on which a pad for receiving the photo detector 11 is formed, is mounted on the stem 12. Then, the photo detector 11 is bonded onto the pad. The stem 12 is fitted into the cap 16, to which the ball lens 17 has already been secured, and then the stem 12 is fixed to the cap 16 by resistance welding. Finally, after the optical fiber 18 held by the ferrule 19 is optically aligned with the photo detector 11, the ferrule 19 is secured to the cap 16 by YAG welding.

The factors affecting the coaxiability between the photo detector 11 and the ball lens 17 are listed below.

(1) Precision of the patterning of the pad on the base 13

(2) Positional accuracy of mounting the base 13 on the stem 12

(3) Accuracy of bonding the photo detector 11 onto the base 13

(4) Accuracy in resistance-welding the cap 16 to the stem 12

(5) Coaxiality between the cap 16 and the ball lens 17

The separations due to these factors are accumulated, which results in a total separation between the photo detector 11 and the ball lens 17.

Each of the above-listed factors will now be explained in more detail.

(1) Precision of the patterning pad on the base 13

The base 13 is made of ceramic, and a pad for receiving the photo detector 11 is formed on the base 13 by etching using a photomask. The precision of the patterning of the pad is determined by the precision of the alignment of the photomask.

(2) Positional accuracy of mounting the base 13 on the stem 12

In order to mount the base 13 on the stem 12 at the proper position with a high degree of precision, the base 13 and the stem 12 are coupled using a coupling tool 21 shown in FIG. 5, which illustrates the coupling steps. The upper half of FIG. 5 shows cross-sectional views, while the lower half shows the corresponding perspective views.

The coupling tool 21 has a guide hole 21-1 whose diameter is slightly larger than the outer diameter of the base 13, and a guide hole 21-2 whose diameter is slightly larger than the diameter of the component-mounting area of the stem 12. The guide holes 21-1 and 21-2 are concentric.

In coupling the base 13 to the stem 12, the base 13 is set into the guide hole 21-1 of the coupling tool 21, as shown in FIG. 5(1), and a bond (not shown), such as solder, is put on the top surface of the base 13.

The coupling tool 21, in which the base 13, the bond, and the stem 12 are set, is heated up, as shown in FIG. 5(3), whereby the base 13 and the stem 12 are bonded to each other.

Finally, the base 13 and the stem 12, which are now bonded into one unit, are removed from the coupling tool 21, as shown in FIG. 5(4).

In this process, the coaxiality between the base 13 and the stem 12 depends on the gap between the guide hole 21-1 and the base 13, and the gap between the guide hole 21-2 and the stem 12.

In this embodiment, a commercially available TO-46-type stem is used. This stem 12 is press-processed, and the outer diameter of the component-mounting part, including the systematic error (or tolerance), is ø4.2±0.025 mm. The base 13 is made of ceramic, and its outer diameter tolerance depends on the amount of contraction during the baking process. The actually measured tolerance of the base 13 is ±0.03 mm. The diameters of the guide holes 21-1 and 21-2 of the coupling device 21 are set slightly larger than the maximum tolerances of the base 13 and the stem 12, respectively. Accordingly, the maximum separation of axes between base 13 and stem 12 caused in the worst case is about 0.065 mm. Since the side wall 30 of the base 13 must not stick out beyond the side wall 31 of the stem 12 even in the worst case, the outer diameter of the base 13 is set slightly smaller than the outer diameter of the stem 12.

(3) Accuracy of bonding of the photo detector 11 onto the base 13

The photo detector 11 is mounted on the pad formed on the base 13 by an ordinary bonding process. The uncertainty of the positioning of the photo detector 11 with respect to the pad is about 0.05 mm.

Figures 6A, 6B:
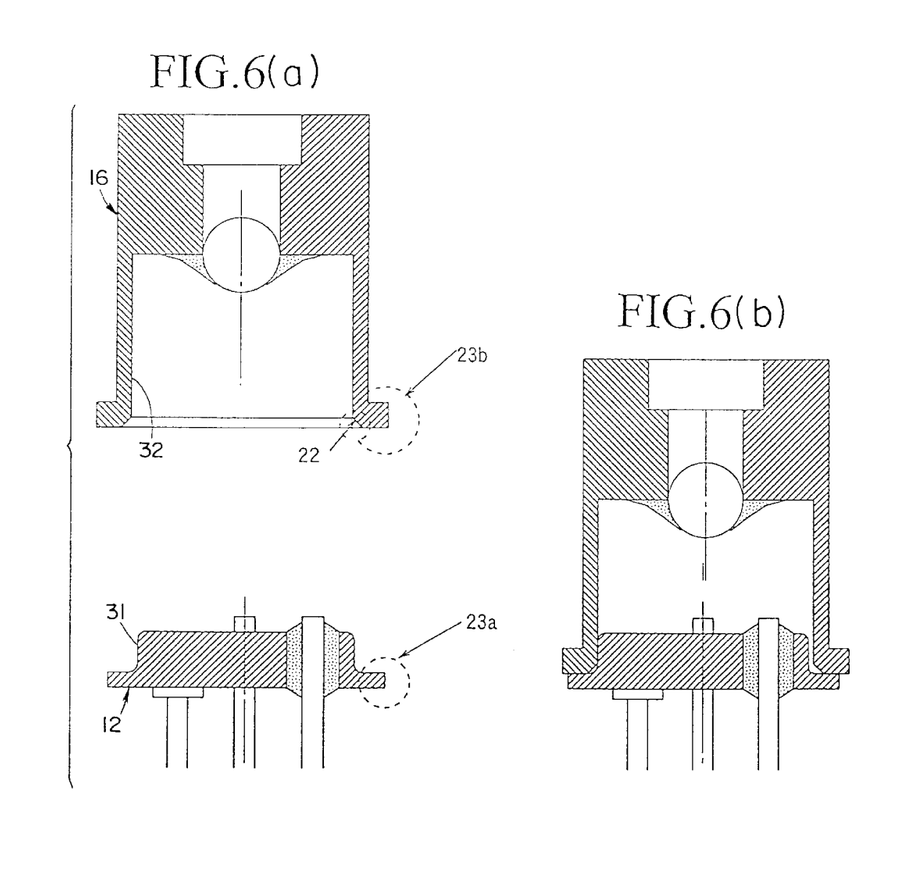
FIG. 6 illustrates how the stem is fixed to the cap.

(4) Accuracy in resistance-welding the cap 16 to the stem 12

FIG. 6 illustrates how the cap 16 is fixed to the stem 12. The stem 12 is fitted into the cap 16 so that the side wall 31 of the component-mounting part of the stem 12 comes into contact with the inner surface 32 of the edge of the cap 16. The coaxiality between the cap 16 and the stem 12 depends on the gap between the outer diameter of the component-mounting part of the stem 12 and the inner diameter of the cap 16.

As has been explained above, the outer diameter of the component-mounting part of the stem 12 is ø4.2±0.025 mm. The cap 16 is manufactured by cutting processes, and the uncertainty in its inner diameter is ±0.025 mm or less. Accordingly, if the inner diameter of the cap 16 is set to ø4.25±0.025 mm, the maximum separation between the cap 16 and the stem 12 is only 0.050 mm in the worst case.

The flange 23a of the stem 12 and the flange 23b of the cap 16 are fixed to each other by resistance welding. The inner corner of the flange 23b of the cap 16 is chamfered, as indicated by the numerical reference 22 in FIG. 6. In general, the boundary between the flange 23a and the side wall of the press-processed stem 12 becomes distorted during the resistance welding. However, the chamfer 22 can prevent such distortion from adversely affecting the bonding of the stem 12 and the cap 16. The shape of the chamfer 22 is not limited to the example shown in FIG. 6, and any shapes can be selected as long as the flange 23b of the cap 16 does not come into contact directly with the distortion of the stem 12.

In the example shown in FIG. 6, the diameter of the flange 23b of the cap 16 is set larger than the diameter of the flange 23a of the stem 12. The flange 23b of the cap 16 is also thicker than the flange 23a of the stem 12 because the cap 16 is formed by cutting processes. During the resistance welding, the flange 23b of the cap 16 and the flange 23a of the stem 12 are pressed against each other at an appropriate pressure, and the flange 23b of the cap 16, which is thicker and has a greater diameter than the flange 23a of the stem 12, can reliably receive and hold the stem 12 during the resistance welding.

(5) Coaxiality between the cap 16 and the ball lens 17

The ball lens 17 is secured to the cap 16 by low-temperature-melting glass using an ordinary alignment device. A conventional alignment device is sufficient to reduce errors in the coaxiality and the position along the optical axis.

As has been described, each component is positioned and aligned with a high degree of precision, and the overall coaxiality between the photo detector 11 and the ball lens 17 is greatly improved as compared with the conventional art.

In this embodiment, the coaxiality between the photo detector 11 and the ball lens 17 is within 0.1 mm. It was confirmed by experiment that, with this arrangement, the amount of reflected light and the coupling efficiency do not greatly change with variation of the slanting angles and the orientations of the end surfaces of the optical fiber 18 and the ferrule 19. The troublesome steps. performed in the prior art of adjusting the orientation of the ferrule 19 to the optimal angle, while monitoring the physical properties of the optical system, can be eliminated, and the work efficiency can thereby be improved.

The accuracy of positioning along the optical axis is also improved because the cap 16 is manufactured by cutting processes, and the height of the cap 16 can be set to the most appropriate value so as to satisfy the predetermined optical-coupling conditions. In other words, the cap 16 processed by cutting and having a desired height in accordance with the predetermined conditions is bonded directly to the stem 12 by resistance welding, without requiring further positioning or adjustment along the optical axis. This is a great advantage over the conventional press-processed cap.

Thus, the cap 16 functions as a positional reference along the optical axis of the optical system, which consists of the optical device (photodetector 11) formed on the stem, the ball lens 17, and the external optical member (i.e., the optical fiber 18). This facilitates the optical alignment of the optical fiber, and the reflected light from the top surface of the photo detector can be stably reduced.

In addition, adhesive or solder used in the prior art is eliminated, and the reliability and mechanical accuracy of the entire module can be improved.

Although a photo detector module and its manufacturing method have been described, the present invention can also be applied to a light-emitting module. In this case, a ball lens is incorporated into a cap processed by cutting, and the cap is resistance-welded to a stem using the cap's height as a positioning reference along the optical axis. Accordingly, a light-emitting module using a laser diode (LD) is also included in the scope of the invention.

What is claimed is:

1. An optical module comprising:
   a stem having an interconnection terminal;
   a base bonded onto the stem by fitting the base and the stem into a predetermined guide hole of a coupling tool and heating the coupling tool so as to couple the base and the stem;
   an optical device positioned on a surface of the base and electrically connected to the interconnection terminal;
   a cap fixed onto the stem so as to enclose the optical device within the cap;
   an optical fiber connected to the cap such that an end surface of the optical fiber projects into the cap along an optical axis so as to be optically coupled to the optical device; and
   a lens for optically coupling the optical device with an optical member positioned outside the cap;
   wherein the cap has a predetermined height so as to maintain a predetermined distance between the end surface of the optical fiber and the optical device.

2. The optical module according to claim 1, wherein the stem is fixed to the cap and a side wall of the stem is adapted to function as a reference for maintaining a coaxiality between the optical device and the lens.

3. The optical module according to claim 1, wherein a top surface of the cap is positioned a predetermined distance from the lens.

4. The optical module according to claim 3, wherein a focal point of the lens is positioned below the top surface of the cap.

5. The optical module according to claim 3, further comprising:
   a fiber holder for holding the optical fiber and having an end surface fixed to the top surface of the cap, wherein the end surface of the optical fiber extends from the end surface of the fiber holder a predetermined distance along the optical axis.

6. The optical module according to claim 5, wherein the fiber holder is a ferrule, and the optical fiber is inserted into the ferrule.

7. The optical module according to claim 6, wherein the ferrule is fixed to the cap by welding.

8. The optical module according to claim 3, wherein the stem is a metallic stem, the cap is a metallic cap, and the metallic cap is fixed to the stem by resistance welding.

9. The optical module according to claim 1, wherein the optical device is a photo detector.

10. The optical module according to claim 1, wherein an optical system consists of the optical device, the lens, and the optical member aligned along the optical axis.

11. The optical module according to claim 1, wherein the lens is positioned within the cap between the end surface of the optical fiber and the optical device.

12. A method of manufacturing an optical module comprising:
    positioning an optical device on a surface of a base;
    bonding the base onto a stem having an interconnection terminal, and electrically connecting the optical device to the interconnection terminal;
    said bonding of the base onto the stem comprising fitting the base and stem into a predetermined guide hole of a coupling tool and heating the coupling tool so as to couple the base and stem;
    positioning a lens at a predetermined position in a cap having a predetermined height;
    connecting an optical fiber to the cap such that an end surface of the optical fiber projects into the cap along an optical axis so as to be optically coupled to the optical device; and
    fixing the cap onto the stem so as to enclose the optical device within the cap, wherein the cap having the predetermined height is arranged to maintain a predetermined distance between the end source of the optical fiber and the optical device.

13. The method of manufacturing an optical module according to claim 12, wherein the stem is fixed to the cap and shaped such that a side wall of the stem is adapted to function as a reference for maintaining a coaxiality between the optical device and the lens.

14. The method of manufacturing an optical module according to claim 12, further comprising:
    holding the optical fiber by a fiber holder so that the end surface of the optical fiber is located a predetermined position from an end surface of the fiber holder; and
    fixing the end surface of the fiber holder to the top surface of the cap.

15. The method of manufacturing an optical module according to claim 14, wherein said positioning of the lens comprises positioning the lens so that a focal point of the lens is positioned below the top surface of the cap.

16. The method of manufacturing an optical module according to claim 14, wherein the stem is a metallic stem, the cap is a metallic cap, and the metallic cap is fixed to the metallic stem by resistance welding.

17. The method of manufacturing an optical module according to claim 16, wherein the stem has a first flange for the resistance welding, the cap has a second flange for the resistance welding, and a diameter of the second flange is set larger than a diameter of the first flange.

18. The method of manufacturing an optical module according to claim 14, wherein said holding of the optical fiber by a fiber holder comprises inserting the optical fiber into a ferrule.

19. The method of manufacturing an optical module according to claim 12, further comprising providing a chamfer on an inner corner of the cap.

20. The method of manufacturing an optical module according to claim 20, wherein said positioning of the lens in the cap comprises positioning the lens between the end surface of the optical fiber and the optical device.

21. The method of manufacturing an optical module according to claim 12, further comprising removing the base and the stem from the coupling tool after the base and the stem have been coupled.

* * * * *